(12) United States Patent
Thakur et al.

(10) Patent No.: US 11,379,694 B2
(45) Date of Patent: Jul. 5, 2022

(54) SCALABLE AND DYNAMIC DATA COLLECTION AND PROCESSING

(71) Applicant: VMWARE, INC., Palo Alto, CA (US)

(72) Inventors: Aishwary Thakur, Bangalore (IN); Vishweshwar Palleboina, Bangalore (IN); Venkata Ramana, Bangalore (IN); Rahul Chattopadhyay, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 430 days.

(21) Appl. No.: 16/663,679

(22) Filed: Oct. 25, 2019

(65) Prior Publication Data

US 2021/0125002 A1    Apr. 29, 2021

(51) Int. Cl.
*G06K 9/62* (2022.01)
*G06F 9/38* (2018.01)
*G06F 9/54* (2006.01)
*G06N 20/00* (2019.01)

(52) U.S. Cl.
CPC ......... *G06K 9/6262* (2013.01); *G06F 9/3836* (2013.01); *G06F 9/542* (2013.01); *G06K 9/6256* (2013.01); *G06N 20/00* (2019.01)

(58) Field of Classification Search
CPC .. G06K 9/6262; G06K 9/6256; G06F 9/3836; G06F 9/542; G06N 20/00
See application file for complete search history.

(56) References Cited

U.S. PATENT DOCUMENTS

| 9,632,861 | B1 | 4/2017 | Watanabe | |
|---|---|---|---|---|
| 9,652,504 | B2* | 5/2017 | Aggarwal | G06F 16/24568 |
| 9,652,525 | B2* | 5/2017 | Patton | G06F 16/487 |
| 10,007,886 | B1* | 6/2018 | Khvostichenko | G06Q 10/1093 |
| 10,812,424 | B1* | 10/2020 | Bommaraju | H04L 51/046 |
| 10,902,349 | B2* | 1/2021 | Ghosh | G06F 11/30 |
| 11,061,798 | B1* | 7/2021 | Jain | G06F 11/3438 |
| 2008/0086347 | A1* | 4/2008 | Yokota | G06Q 10/06375 |
| | | | | 705/7.11 |

(Continued)

OTHER PUBLICATIONS

Wang et al., Low-Power Sensor Polling for Context-Aware Services on Smartphones, 2015, IEEE, pp. 617-622 (Year: 2015).*

*Primary Examiner* — Lewis G West
(74) *Attorney, Agent, or Firm* — Clayton, McKay & Bailey, PC (57) ABSTRACT

Examples described herein include systems and methods performing scalable and dynamic data processing and extraction. A first example method relates to processing events from a source. The method can include detecting an event generated by the source and predicting a probability of that event being part of a span including multiple events. The method can include waiting for the additional multiple events to occur within the predicted timeframe and, if occurring, packaging the events together for handling by a single dynamic function. Otherwise, the events can each be handled by separate dynamic functions. A second example method relates to performing dynamic data extraction from a source. The method can include waking up a function based on a regular poll interval, determining a probability of a data change at the source based on historical data extractions, and invoking an extraction function based on the probability of the data change.

20 Claims, 7 Drawing Sheets

(56) References Cited

U.S. PATENT DOCUMENTS

| | | | |
|---|---|---|---|
| 2013/0029732 A1* | 1/2013 | Kim | H04W 52/0248 455/574 |
| 2014/0122396 A1* | 5/2014 | Swaminathan | G06N 5/02 706/14 |
| 2014/0379904 A1* | 12/2014 | Shimasaki | H04L 43/0805 709/224 |
| 2015/0058345 A1 | 2/2015 | Mishra | |
| 2015/0186497 A1* | 7/2015 | Patton | G06F 16/489 707/740 |
| 2015/0235133 A1* | 8/2015 | Aoki | G06N 5/04 706/12 |
| 2015/0347908 A1* | 12/2015 | Mathew | H04L 67/10 706/12 |
| 2016/0034712 A1 | 2/2016 | Patton | |
| 2016/0241578 A1* | 8/2016 | Mahler | H04L 63/1425 |
| 2017/0048264 A1* | 2/2017 | Chauhan | G06F 21/629 |
| 2017/0161659 A1 | 6/2017 | Goldstein | |
| 2017/0178011 A1* | 6/2017 | Yeung | G06F 1/163 |
| 2017/0262818 A1* | 9/2017 | Horrell | G06Q 10/067 |
| 2018/0018436 A1 | 1/2018 | Opitz | |
| 2018/0025288 A1* | 1/2018 | Piche | G06F 30/23 706/46 |
| 2018/0150783 A1* | 5/2018 | Xu | G06Q 10/0633 |
| 2018/0293697 A1* | 10/2018 | Ray | G06F 9/3887 |
| 2019/0016258 A1 | 1/2019 | Snyder | |
| 2019/0147354 A1 | 5/2019 | Gao | |
| 2019/0171187 A1* | 6/2019 | Celia | G06N 20/00 |
| 2019/0236199 A1* | 8/2019 | Mahalingam | G06F 16/2358 |
| 2019/0287002 A1* | 9/2019 | Bhoj | H04L 67/025 |
| 2019/0310997 A1 | 10/2019 | Gratton | |
| 2019/0364110 A1* | 11/2019 | Henry | H04L 67/2833 |
| 2019/0392065 A1* | 12/2019 | Bangalore Ananthakumar | G06F 16/2228 |
| 2020/0003659 A1* | 1/2020 | Davies | G01R 19/2513 |
| 2020/0120122 A1* | 4/2020 | Du | H04L 63/1416 |
| 2020/0349510 A1* | 11/2020 | Dhonde | G06K 7/1413 |
| 2020/0364723 A1 | 11/2020 | Gitlevich | |
| 2020/0401911 A1 | 12/2020 | Zhang | |
| 2021/0085239 A1 | 3/2021 | Guidotti | |
| 2021/0089974 A1* | 3/2021 | Hudson | H04L 12/1818 |
| 2021/0097433 A1* | 4/2021 | Olgiati | G06F 11/0793 |
| 2021/0124604 A1* | 4/2021 | Thakur | G06K 9/6256 |
| 2021/0342649 A1* | 11/2021 | Doda | G06N 20/00 |
| 2021/0392171 A1* | 12/2021 | Srinivas | H04L 63/1425 |
| 2022/0036002 A1* | 2/2022 | Sriharsha | G06F 40/284 |
| 2022/0036177 A1* | 2/2022 | Sriharsha | G06F 16/245 |

\* cited by examiner

SCALABLE AND DYNAMIC DATA COLLECTION AND PROCESSING

BACKGROUND

Many software products collect new data from remote sources in order to provide updated information to a user. For example, an email application receives new email messages, a news application receives updated news stories, and a workflow application receives workflow updates. The updated information can then be processed and presented to the user in a manner that increases the user's productivity.

Generally speaking, data collection can be performed according to an event-driven model or a periodic-pull model. In the event-driven model, the data source recognizes an event and sends a notification of that event. For example, an email server can send a notification that a change has occurred in a user's email folder. An email application can receive the event notification and, in response, contact the email server to retrieve the new information.

Event-driven models have several drawbacks. For example, some data sources emit numerous events, some of which are not usable by the receiving application or system. In some examples, a single actionable item—such as a new email—can generate numerous events and associated notifications, increasing the overall noise in the data-communication channel. Reacting to every single event results in an inefficient use of computing and networking resources. It also presents scalability issues and can crash the system during event spikes. Additionally, if a live connection with the source is lost, any events emitted during that time may be lost as well.

In a periodic-pull model, an application can periodically poll a source for new information. For example, a productivity application on a user device can poll a source server on a predetermined schedule, requesting either the most recent records for an account or the full data load for the account. Periodic-pull systems have their own drawbacks, however. Each pull request typically includes an application programming interface ("API") call to the source, which in turn ties up resources at the source. And because the pulls occur periodically according to a schedule, some pulls end up being unnecessary because no new data is available. Meanwhile, even when pulls return usable data, the data may be outdated based on the timing between pulls. The same static pull periods are typically used for all instances of an application, regardless of how often a particular instance is likely to receive new data, relative to other instances. These drawbacks decrease productivity and increase infrastructure costs.

As a result, a need exists for smart, scalable, dynamic data collection and processing techniques.

SUMMARY

Examples described herein include systems and methods for performing scalable and dynamic data processing and extraction. A first example method relates to processing events from a source. An event can be an indication emitted by, or on behalf of, a source. The indication can be for any purpose, such as to indicate that new information is available at the source. The source can be any source capable of sending events, including for example a remote server or datacenter. As an example, a remote server associated with a social-media application can be the source. The server can emit an event indicating that a message has been received at a user's social-media account.

The example method can include detecting an event generated by the source. The detection can be performed by a collector system, for example. The method can further include predicting a probability of the first event being part of a span. The span can be a group of multiple events occurring within a time threshold. For example, a span can be any three events occurring within a two-second time period. In some examples, a span is a group of related events occurring within a time threshold. For example, a span can be any two events related to received messages occurring within a five-second time period. There are no limitations on how short or long a span is, the number of events in the span, or the type of events required for the span.

Predicting the probability of a span can be based on historical information relating to events emitted from the source or other sources, as explained further herein. In some examples, predicting the probability of the event being part of a span can be performed by a machine learning model. The model can be trained based on historical information relating to one or more sources. Events that occur after the prediction can be provided as feedback to the machine learning model and used for further refinement of the model.

The example method can also include, based on the probability exceeding a probability threshold, identifying additional events expected to occur within the span. For example, the probability of a span can be determined to be 0.8. If the probability threshold is 0.5, then the probability of a span exceeds the threshold. Based on the probability exceeding the threshold, the method can include identifying additional events expected to occur within the span. This can include, for example, identifying a total number of additional events or a number of certain types of events.

The example method can include waiting for the identified events to occur within the span. An event can be considered to occur within the span if the event is emitted by the source within the time threshold defined by the span. If all of the identified events occur within that time threshold, then the example method can further include packaging the events of the span and sending the package to an orchestrator. The method can also include invoking a dynamic function for handling the package. The dynamic function can, for example, reach out to the source to retrieve information implicated by the events of the package. The package can be persistently stored for later use in some examples.

On the other hand, if fewer than all of the identified events occur within the time threshold, the example method can include sending the first event, and any subsequently occurring events, individually to the orchestrator. The method can further include invoking separate dynamic functions for each of the individual events. The dynamic functions can, for example, each contact the source to request further information related to the relevant event.

A second example method is provided for performing dynamic data extraction from a source. The method can include waking up a function based on a regular poll interval. For example, after a predefined time period has expired, the system can execute a function. The function can be a software function relating to extracting data from a source.

The method can further include determining a probability of a data change at the source. The probability can be determined based on past data extractions from the source, for example. Based on the probability of the data change exceeding a change threshold, the example method can further include invoking an extraction function for extracting data from the source. The method can then include extracting the data from the source.

If the probability of the data change is below the change threshold, the method can include delaying invocation of the extraction function. In this manner, the extraction function is only called when there is a threshold probability of a data change at the source. The extraction function can be code that executes on a server remote from the source in one example.

Determining the probability of a data change at the source can be based on at least one of a month of the year of previous data extractions, a week of the month of previous data extractions, a day of the week of previous data extractions, an hour of the day of previous data extractions, and a minute of the hour of previous data extractions. The determination can be performed according to a machine learning model in some examples. After an attempted data extraction by the extraction function, the method can include providing information regarding the attempted extraction to the machine learning model for further refinement of the model. The extracted data can be persistently stored for further processing.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described. The systems and methods described herein can be implemented by physical computing devices or by virtualized infrastructure such as a virtual machine.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for performing scalable and dynamic data processing and extraction. A first example method relates to processing events from a source. The method can include detecting an event generated by the source and predicting a probability of that event being part of a span including multiple events. The method can include waiting for the additional multiple events to occur within the predicted timeframe and, if occurring, packaging the events together for handling by a single dynamic function. Otherwise, the method can include sending the events for handling by individual dynamic functions.

A second example method relates to performing dynamic data extraction from a source. The method can include waking up a function based on a regular poll interval, determining a probability of a data change at the source based on historical data extractions, and invoking an extraction function based on the probability of the data change.

Figure 1:
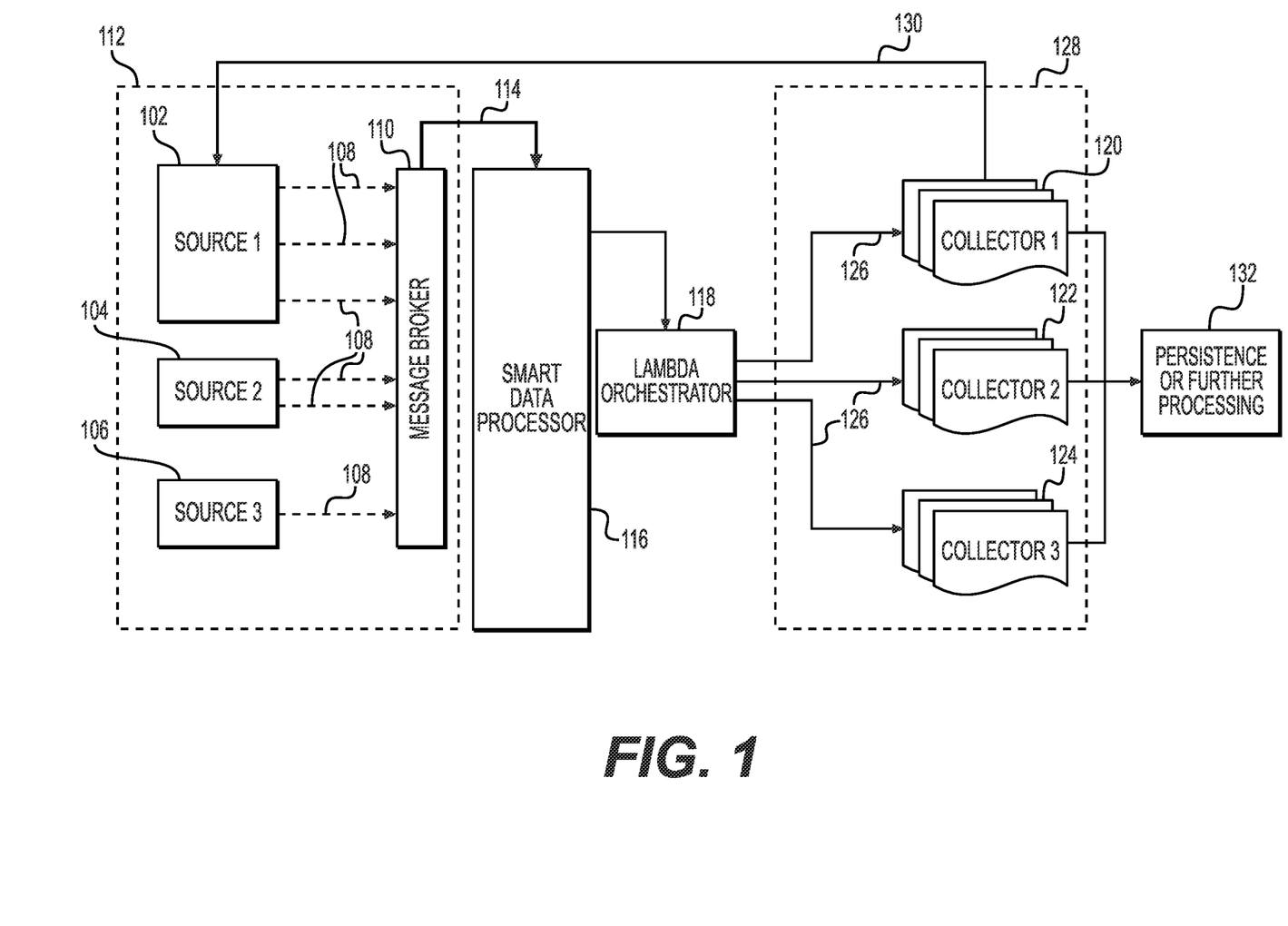
FIG. 1 is an illustration of a system for performing scalable and dynamic data processing and extraction.

FIG. 1 provides an illustration of a system for performing scalable and dynamic data processing and extraction based on an event-driven data model. The example system includes three sources 102, 104, 106 that can represent remote servers, or groups of servers. The sources 102, 104, 106 can generate event notifications based on events occurring at the sources 102, 104, 106. For example, source 102 can be an email server that emits event notifications based on a change in a user's email folder, such as when the user receives a new email. Similarly, source 104 can be a messaging server that emits event notifications based on the user's account receiving a message. In another example, source 106 can be a cloud service that emits event notifications based on computing infrastructure usage or problems. The sources 102, 104, 106 can be any type of remote endpoint that provides event notifications.

FIG. 1 depicts that each source 102, 104, 106 can emit one or more event notifications 108, which are received by a message broker 110. The terms "event," "event notification," and "notification" are used interchangeably herein and are not intended to be limiting in any way. In some examples, an event can occur at a source 102, 104, 106 and the source 102, 104, 106 can then generate an event notification describing the event in some manner. In another example, the notification itself can be considered an event.

The event notifications 108 can be received at a message broker 110. The message broker 110 can be a standalone server in some examples. In other examples, the message broker 110 is a piece of software code that executes on a server. The message broker 110 can be implemented in a virtual machine in some examples. The message broker 110 can collect all incoming event notifications 108 from all relevant sources 102, 104, 106 and pass them to the smart data processor 116 at stage 114. The smart data processor 116 similarly can be a standalone server or software code executing on a server or virtual machine.

The smart data processor 116 can perform various functions described later in this disclosure, such as predicting event 108 flows from the sources 102, 104, 106 and determining when and how to pass the collected events to an orchestrator 118. The smart data processor 116 can include a machine learning component that implements one or more machine learning models to make predictions regarding events. As explained later, if the smart data processor 116 is expecting a cluster of related events 108, it can hold the events 108 in a storage location until the expected events 108 occur or until a time period runs out. If the expected events 108 occur, the smart data processor 116 can package the events 108 and provide the package to the orchestrator 118. Otherwise, the smart data processor 116 can provide the events 108 individually to the orchestrator 118.

The orchestrator 118 can be another piece of software code executing on the same or different server, virtual machine, or other computing device than the smart data processor 116. The orchestrator 118 can include logic for invoking dynamic functions 120, 122, 124 for collecting or processing data relating to the relevant events 108. The dynamic function can also be referred to as a temporary function, lambda function, lambda, or collector. The dynamic functions 120, 122, 124 can be generated by the lambda orchestrator 118 on an as-needed basis, saving system resources until they are required. The dynamic functions 120, 122, 124 can execute on the same or a different server, virtual machine, or computing device as the lambda orchestrator 118.

In some examples, the lambda orchestrator 118 identifies a relevant dynamic function 120, 122, 124, causes it to be invoked or implemented, and sends the corresponding collected event(s) at stage 126. The dynamic function 120, 122, 124 can receive the collected event(s) and perform relevant processing. For example, a dynamic function 120 can contact a source 102, such as at stage 130 in FIG. 1, and request additional data relating to the event(s) 126 as necessary. For example, if a package of events 126 relates to a new email message received at the user's email account at source 102, the dynamic function 120 can request the new email message from the source 102. The received information can be persistently stored at a memory storage location 132 or sent to another component for further processing.

Figure 2:
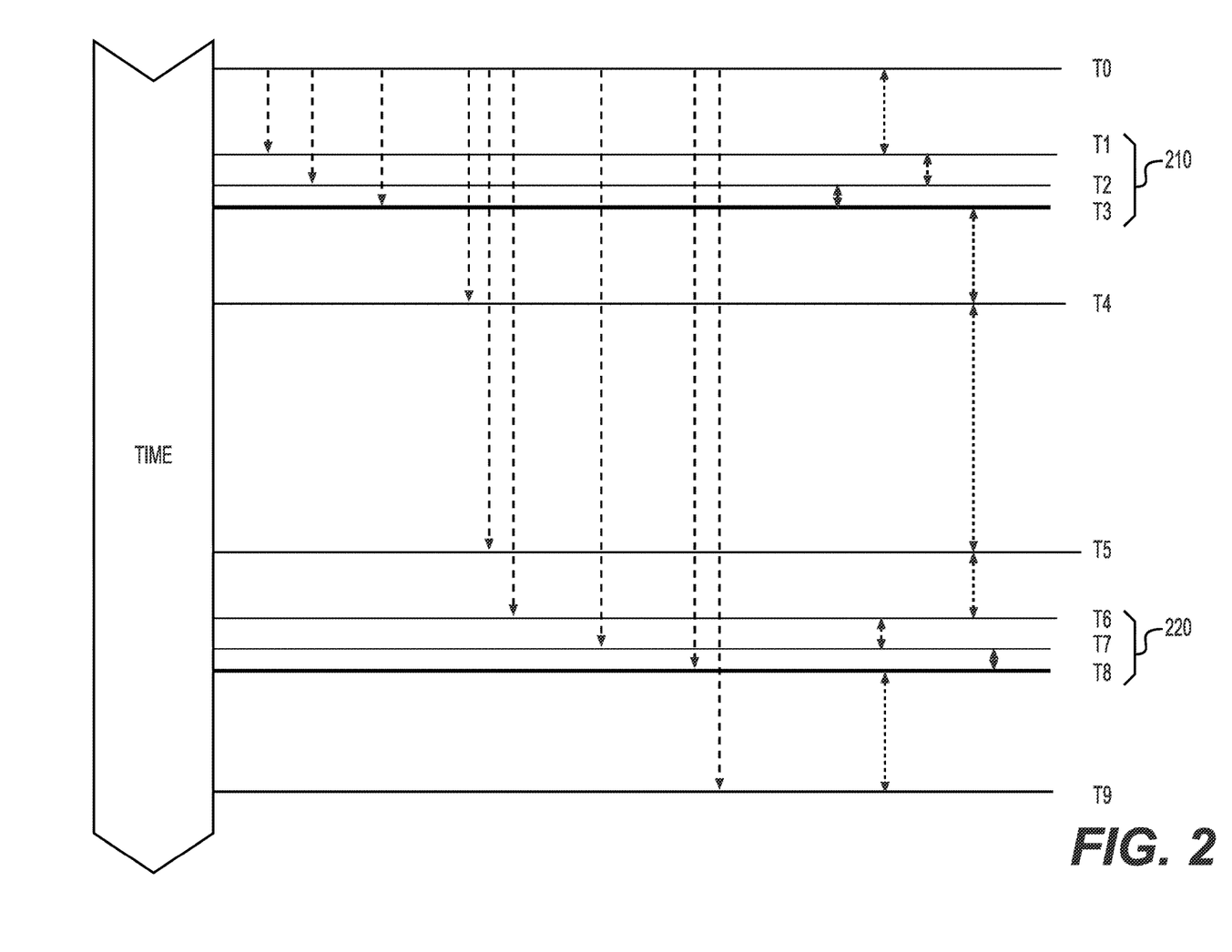
FIG. 2 is an illustration of a time series plot of events from a data source.

FIG. 2 provides an illustration of a time series plot of events 108, with each separate event being labelled according to the chronological order in which it occurs. For example, the first occurring event is labelled T0, the next occurring event is labelled T1, and so on. The spacing between events indicates the relative gap in time between those events. In this example, the gap in time between events T0 and T1 is larger than the gap in time between events T1 and T2. The events and time gaps are merely exemplary, intended to show an example of events being generated at or by a source 102, 104, 106. The time series plot starts at time zero, at the top, and continues chronologically in the downward direction.

In FIG. 2, the single-sided arrows depict a total elapsed time since event T0 occurred. For example, the elapsed time for event T5 is the difference in time between T5 and T0. Meanwhile, the double-sided arrows depict an elapsed time since the previous event. Both types of time measurement can be used by the smart data processor 116 to predict whether a span is likely to occur. A span can be a group of at least two events that occur within a specific time threshold.

Spans can be predicted based on any relevant information relating to events. For example, a span can be predicted based on a type of event—such as an event typically followed by one or more additional events. In another example, a span can be predicted based on the type of resource being received or utilized. Spans can also be predicted based on a type of application related to an event, a status of the source server, and the date and time of an event. Of course, the time elapsed from one or more previous events, such as the single- and double-side arrows in FIG. 2, can also be used to predict a span.

FIG. 2 also shows two spans 210, 220 that have been detected in this example. The first span 210 begins at event T1 and extends to event T3, while the second span 220 begins at event T6 and extends to event T8. These spans 210, 220 can be predicted and detected by the smart data processor 116 of FIG. 1. As a result of detecting a span 210, 220, the smart data processor 116 can package the events of a span 210, 220 together, such that events T1-T3 make up one package while events T6-T8 make up another package. The packages can then be processed as a group, requiring only one dynamic function 120, 122, 124 in order to process further. The non-spanned events, such as events T0, T4, T5, and T9 can be processed individually, each requiring a separate dynamic function 120, 122, 124 in some examples.

Figure 3:
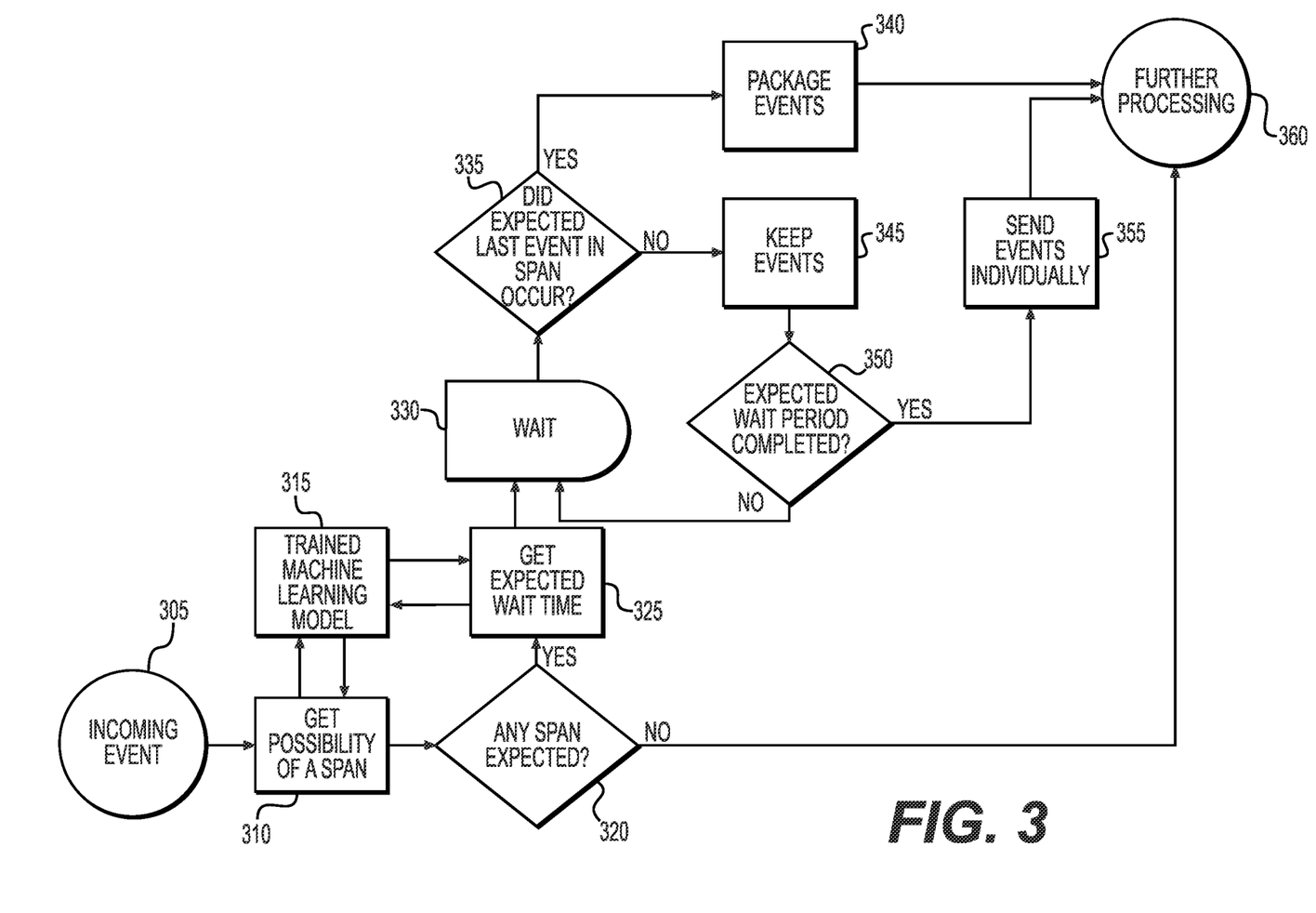
FIG. 3 is a flowchart of an example method for performing scalable and dynamic data processing and extraction.

FIG. 3 provides a flowchart of an example method for performing scalable and dynamic data processing and extraction, utilizing the system of FIG. 1 and the event information of FIG. 2. At stage 305, a source 102, 104, 106 can emit an event that is detected by the message broker 110 of FIG. 1. The message broker 110 can pass the event information to the smart data processor 116 as part of stage 310.

Stage 310 can also include calculating the probability of a span based on the incoming event. The calculation can include feeding information regarding the event to a trained machine learning model at stage 315. In some examples, the machine learning model is executed as part of the smart data processor 116. The information provided to the model can include, for example, the elapsed time between a first event (T0) and a most recently received event (such as T3) and the elapsed time between the most recent event (T3) and previous event (T2). The information can also include event type, resource type, resource application type, resource status, and whether the event has any dependency upon any other events. The machine learning model can output a probability of a span that includes the incoming event. The probability can be provided as a decimal or percentage, such as 0.6 or 60%.

At stage 320, the method can include determining whether the predicted probability exceeds a threshold level. The threshold can be set at any probability level, such as 0.5 (50%), 0.8 (80%), or any other number between 0 and 1. If the probability does not exceed the threshold—such as where the probability of a span is 0.2 but the threshold is 0.6—then the method can include sending the incoming event for further processing at stage 360. On the other hand, if the probability exceeds the threshold—such as where the probability of a span is 0.9 while the threshold is 0.6—the method can include retrieving an expected wait time for the span at stage 325.

Retrieving the expected wait time at stage 325 can include selecting a standard wait time in some examples. In other examples, the wait time can be established based on historical time periods for spans that included a similar type of event as the incoming event. Stage 325 can also include requesting an estimate from the machine learning model regarding the expected wait time. At stage 330, the method can then include waiting until either the time elapses or the expected events occur within the time threshold.

For example, at stage 335 a determination can be made as to whether one or more of the expected events occurred within the time threshold. As an example, if the event (T1) was predicted to be part of a span including T2 and T3 within a period of 10 seconds, then at stage 335 the system can determine whether event T2, T3, or both have occurred. When the expected events occur, then at stage 340 the system can package the events together and send the package for further processing at stage 360.

Packaging the events can include sending a group of events in a manner intended for handling as a single event. For example, packaging the events can include sending multiple events along with an instruction to treat the group of events as a single event. The instruction can, for example, request invocation of a single dynamic function by a collector 120, 122, 124. Packaging the events can also include identifying multiple events as being related to one another.

To illustrate, in one example, events T1-T3 of FIG. 2 form a span corresponding to events that relate to a new email message being received at a source email server. The three events can relate to different aspects of the message being received—for example, event T1 can indicate a generic change to the folder, event T2 can indicate the receipt of a new email message, and event T3 can indicate the presence of a new unread email message (which is the new email message). Collectively, these three events originate from a single event of receiving a new email message at the email server. Packaging these events can therefore include sending them as a group, along with information identifying that the group of events relates to a new email message. The information can similarly identify a particular type of dynamic function to invoke, such as a lambda function that collects new messages from the email server. In this manner, the system can avoid generating three separate requests based on events T1-T3, instead handling them as a group with a single request.

Turning back to stage 335, if the last event in a span has not occurred, the system can store any pending events in a storage location at stage 345. This can include saving the event files to a persistent, computer-readable storage location. From there, the method can include determining if the expected wait period has elapsed at stage 350. If not, the system can return to stage 330 and continue to wait, checking for the last event again at stage 335. If the threshold time passes without the last expected event arriving, then at stage 355 the system can send events individually for further processing at stage 360. Sending the events individually can include sending each event without an indication of a grouping or a shared dynamic function for multiple events. The collectors can then generate dynamic functions for each of those events at stage 360.

Figure 4:
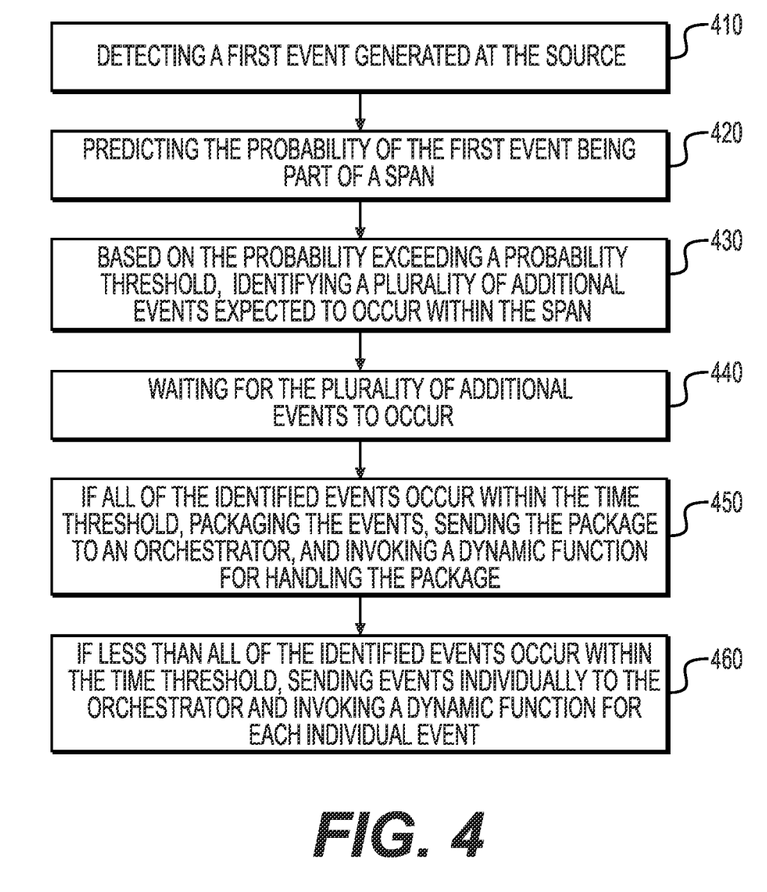
FIG. 4 is a flowchart of an example method for performing scalable and dynamic data processing and extraction.

FIG. 4 provides a streamlined flowchart of an example method for performing scalable and dynamic data processing and extraction. Stage 410 can include detecting a first event generated at a source. In some examples, an event can occur at a source 102, 104, 106 and the source 102, 104, 106 can then generate an event notification describing the event in some manner. In another example, the notification itself can be considered an event. A message broker 110, described with respect to FIG. 1, can receive the event notification and pass it to a smart data processor 116.

Stage 420 can include predicting the probability of the first event being part of a span. The smart data processor 116 can include a machine learning component that implements one or more machine learning models to make predictions regarding events. The model can be trained using historical event information, including timestamps, event type, resource type, resource application type, resource status, and whether the event has any dependency upon any other events. The information provided to the model for prediction at stage 420 can include, for example, the elapsed time between a first event and a most recently received event and the elapsed time between the most recent event and previous event. The information can also include event type, resource type, resource application type, resource status, and dependency information. The machine learning model can output a probability of a span that includes the incoming event.

At stage 430, based on the probability exceeding a probability threshold, the method can include identifying a plurality of additional events expected to occur within the span. The threshold can be established manually, such as by an administrator selecting a threshold of 50% or 0.5, in some examples. In other examples, historical information can be used to select a probability threshold that adequately captures spans without slowing down the process unnecessarily. In some examples, the probability threshold can be based on a particular type of event or a particular source. For instance, one source may have a higher tendency to emit events in clusters than another source, so the probability threshold can be adjusted to reflect that. Similarly, one type of event can have a higher tendency to be followed closely by additional events. The probability threshold can be adjusted accordingly, either manually or automatically through a machine learning service.

When the calculated probability exceeds the threshold, stage 430 can also include identifying additional events that are expected to occur within the span. For example, if event type A is typically followed by event types B and C, then stage 430 can include identifying event types B and C as expected to occur based on event type A occurring. Stage 430 can further include identifying a time threshold within which the additional events of the span are expected to occur.

At stage 440, the system can wait for the additional events to occur. If all of those identified additional events occur within the time threshold, then at stage 450 the method can include packaging the events and sending the package to an orchestrator 118. The orchestrator 118 can invoke a single dynamic function for handling or responding to the package. As an example, if the package of events indicates an update to a user's account at a source, then stage 450 can result in a single dynamic function that retrieves the update from the source. In this example, stage 460 can be skipped.

Alternatively, if fewer than all of the identified additional events occur within the time threshold, then stage 450 can be skipped and stage 460 can instead be carried out. Stage 460 can include sending any occurring events individually to the orchestrator 118 for processing. In some examples, this can result in simply sending the first event, detected at stage 410, to the orchestrator 118. In another example, a total of five events could have been expected at stage 430, but only three of those events were received. In that example, the three events can be provided to the orchestrator 118 individually at stage 118. The orchestrator 118 can then invoke separate dynamic functions for each of the three events.

Figure 5:
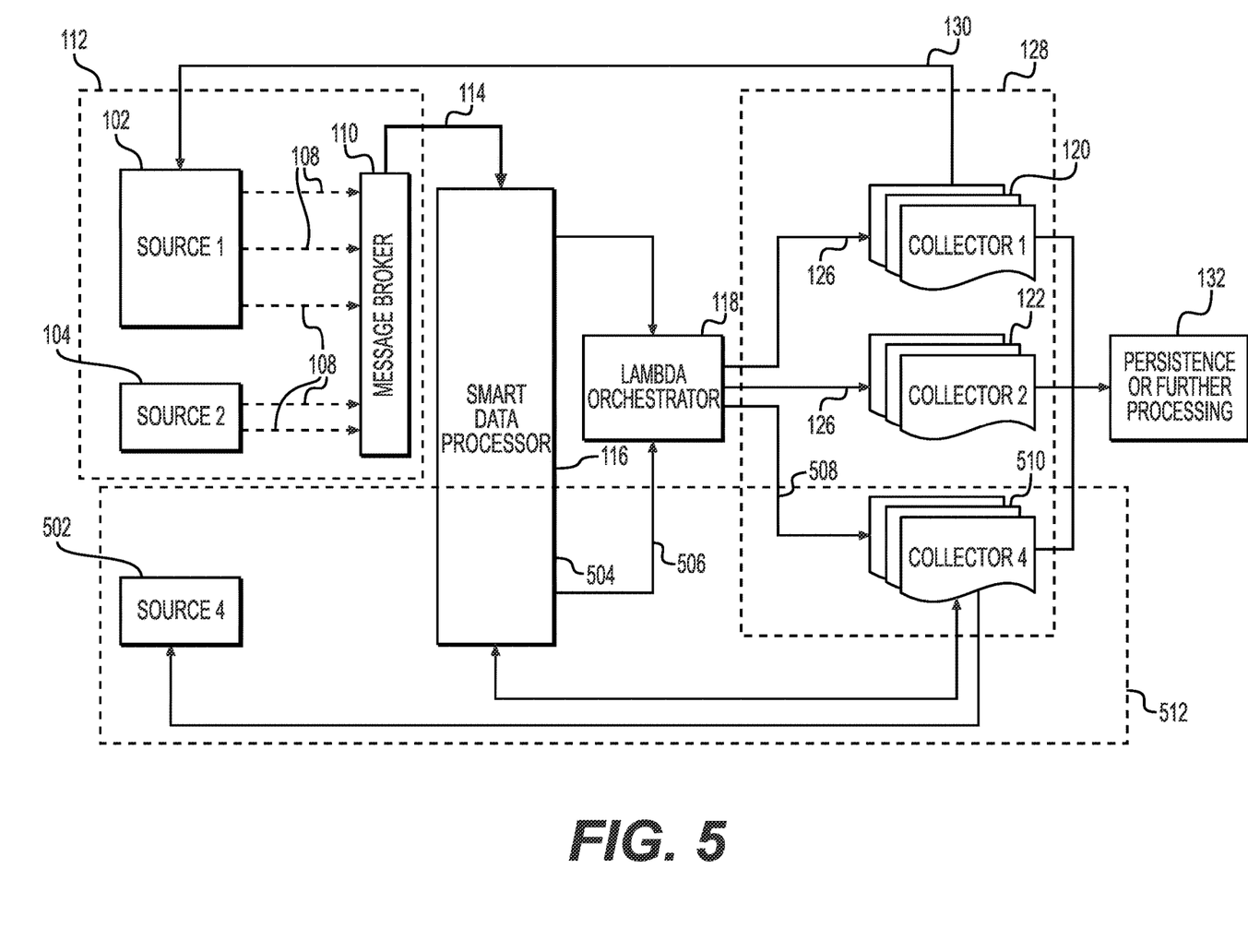
FIG. 5 is an illustration of a system for performing scalable and dynamic data processing and extraction.

FIG. 5 provides an illustration of a system for performing scalable and dynamic data processing and extraction based on a periodic-pull model. The example system can include the same components as the system of FIG. 1, indicated with the same numbering scheme, but also includes a periodic-pull subsystem 512 having additional components. In some examples, the system can include only the additional components.

The system of FIG. 5 includes a new source 502 that does not emit events or event notifications. Instead, the source 502 provides information based on periodic pulls from a separate process. The source 502 can be a remote server, or group of servers, having a hardware-based processor and a non-transitory, computer-readable medium. The source 502 can receive, store, and provide information as a backend endpoint that supports an application or other service. For example, the source 502 can be a server that stores workflow information relevant to a workflow application installed on a user device.

The system of FIG. 5 includes the smart data processor 504 that provides various functionality explained below. In some examples, the smart data processor 504 of FIG. 5 is part of the same smart data processor 116 of FIG. 1. In other examples, the two smart data processors 504, 116 are distinct from one another, such as by being implemented on different hardware or within different virtual machines. The smart data processor 504 can determine when to initiate a data pull from the source 502, as discussed in more detail later.

Once it determines that a data pull should be implemented, the smart data processor 504 can instruct a lambda orchestrator 118 to instantiate a dynamic function at stage 506. The orchestrator 118 can be a piece of software code executing on the same or different server, virtual machine, or other computing device than the smart data processor 504. The orchestrator 118 can include logic for invoking dynamic functions 120, 122, 510 for collecting or processing data relating to the relevant events. The dynamic function can also be referred to as a temporary function, lambda function, or collector. A collector 120, 122, 510 can be generated by the lambda orchestrator 118 on an as-needed basis, saving system resources until they are required. The collector 120, 122, 510 can execute on the same or a different server, virtual machine, or computing device as the lambda orchestrator 118.

Collector 510 can relate to performing a data pull at source 502. The collector 510 can utilize an API call—or another appropriate form of remote request—to contact the source 502 and request a data load. In some examples, the request can include all data stored at the source 502 and relating to the request—such as all data stored relating to a particular user's account. In another example, the request can call for all data stored at the source 502 that has not been collected by the collector 510 previously. Based on the request being received at the source 502, the source 502 can transmit relevant data to the collector 510.

Based on the information received (or not received) from the source 502 as a result of a request, the collector 510 can provide the smart data processor 504 with feedback. The feedback can be a summary of the process and information received as a result of the process. For example, the feedback can identify the date and time of a pull request and the type of information received from the source 502 in response to the request. In some examples, the information sent to the collector 510 is also sent to the smart data processor 504, either by the collector 510 or directly from the source 502.

The smart data processor 504 can then analyze the request and resulting response. This information can be used to influence the timing of future pull requests initiated by the smart data processor 504.

Figure 6:
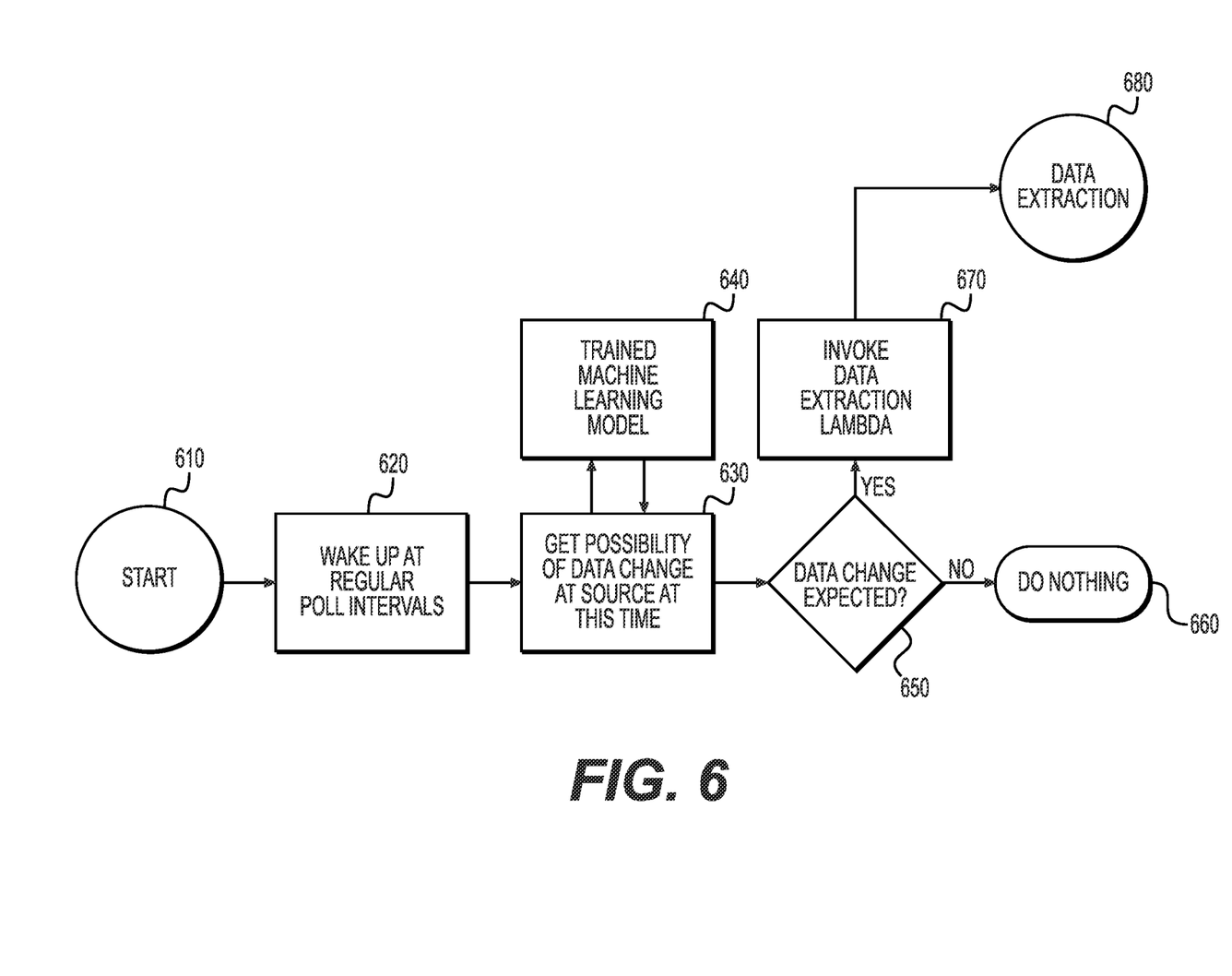
FIG. 6 is a flowchart of an example method for performing scalable and dynamic data processing and extraction.

FIG. 6 provides a flowchart of an example method for performing dynamic data extraction using the system of FIG. 5. The method can start at stage 610, and at stage 620 regular poll intervals can be used to wake up a process for determining whether to execute a pull request. In one example, the wake up is performed by the smart data processor 504. The wake up can be based on a standard time interval, such as one wake-up every 5 minutes. In some examples, the time interval is variable based on system availability, system resources, or time of day.

After the wake-up, the smart data processor 504 can determine a probability of a data change at the source at stage 630. Determining this probability can be based on historical data pulls from the same source, or in some examples, from multiple sources. For example, the historical data can include information such as the time and date of an attempted data pull, whether new data was provided in response to the attempted data pull, the type and amount of new data provided, the time between the data pull and a previous data pull, and whether the pull was attempted at the same source or a different source.

This information can be processed by a machine learning model at stage 640. The model can be integrated within the smart data processor 504 in some examples. Alternatively, the machine learning model can be located remotely, such as on a remote server accessible to the smart data processor 504. Based on consulting the machine learning model at stage 640, the smart data processor 504 can determine a probability of a data change at the source. A data change can be any change in data stored at the source that triggers a data transfer between the source and the receiving system. Examples of new data include a new email or message in a user's account, an updated entry in a table, or an update to an application.

The probability determined at stages 630 and 640 can take into account previous data pulls at various times. For example, the machine learning model may determine that when a data pull is attempted between the hours of 1-4 am in the relevant time zone on a weekday, the probability of a data change is 20%, but when the data pull is attempted between the hours of 5-8 am on a weekday, the probability of a data change is 70%.

At stage 650, the predicted probability can be compared to a probability threshold to determine whether a data change is expected with sufficient certainty. The probability threshold can be established manually, such as by an administrator, or automatically based on output from the machine learning model. In one example, the probability threshold is set at 60%. In that example, if the probability of a data change is 60% or more, the system will attempt a data pull. Meanwhile, if the probability of a data change is less than 60%, the system will not attempt a data pull. Using the example numbers from the previous paragraph, a determination of 20% made during the hours of 1-4 am would not result in a data pull, while a determination of 70% made during the hours of 5-8 am would result in a data pull.

If the probability of a data change does not meet or surpass the threshold, then at stage 660 the system can do nothing—i.e., not perform a data pull at this time. If, instead, the probability of a data change meets or exceeds the threshold, then at stage 670 the system can invoke a data extraction lambda function, also known as a collector 510. This dynamic function 510 can be implemented based on the smart data processor 504 instructing the lambda orchestrator 118 to invoke the function 510. The dynamic function 510 can be generated by the lambda orchestrator 118 on an as-needed basis, saving system resources until they are required. The dynamic function 510 can execute on the same or a different server, virtual machine, or computing device as the lambda orchestrator 118.

The dynamic function 510 can perform an attempted data pull at stage 680. The attempted data pull can include, for example, making an API call to a port of the source intended to receive data pull requests. The source can respond to the data pull request in various ways. In one example, the source sends a full data load for an identified user or user device, allowing the receiving system to sort out which data is new. In another example, the source can track information sent in previous transmissions and send only the new information at stage 680.

Finally, although not depicted in the flowchart of FIG. 6, the example method can include an additional step of providing feedback to the smart data processor 504. The feedback can be a summary of the process and information received as a result of the process. For example, the feedback can identify the date and time of a pull request and the type of information received from the source in response to the request. In some examples, the information sent to the collector 510 is also sent to the smart data processor 504, either by the collector 510 or directly from the source. The smart data processor 504 can then analyze the request and resulting response. This information can be used to influence the timing of future pull requests initiated by the smart data processor 504.

Figure 7:
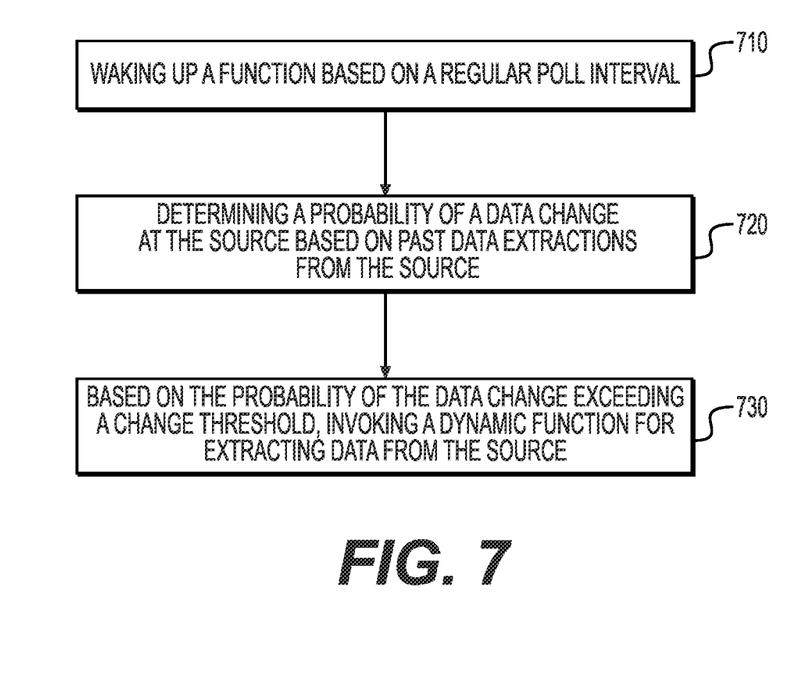
FIG. 7 is a flowchart of an example method for performing scalable and dynamic data processing and extraction.

FIG. 7 provides a simplified flowchart of an example method for performing dynamic data extraction. Stage 710 can include waking up a function based on a regular poll interval. As mentioned above, the wake up can be based on a standard time interval, such as one wake-up every 5 minutes. In some examples, the time interval is variable based on system availability, system resources, or time of day. In one example, the wake up is performed by the smart data processor 504.

Stage 720 can include determining a probability of a data change at the source based on past data extractions from the source. Determining this probability can be based on historical data pulls from the same source, or in some examples, from multiple sources. For example, the historical data can include information such as the time and date of an attempted data pull, whether new data was provided in response to the attempted data pull, the type and amount of new data provided, the time between the data pull and a previous data pull, and whether the pull was attempted at the same source or a different source. This information can be processed by a machine learning model in some examples.

Stage 730 can include, based on the probability exceeding a change threshold, invoking a dynamic function for extracting data from the source. For example, if the probability of a data change meets or exceeds the threshold, then the system can invoke a data extraction lambda function 510. This dynamic function 510 can be implemented based on the smart data processor 504 instructing the lambda orchestrator 118 to invoke the function 510. The dynamic function 510 can be generated by the lambda orchestrator 118 on an as-needed basis, saving system resources until they are required. The dynamic function 510 can, for example, make an API call to a port of the source intended to receive data pull requests. The source can respond to the data pull request in various ways. In one example, the source sends a full data load for an identified user or user device, allowing the receiving system to sort out which data is new. In another example, the source can track information sent in previous transmissions and send only the new information at stage 730.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for performing dynamic data extraction from a source, comprising:
   waking up a function based on a regular poll interval;
   determining a probability of a data change at the source, wherein determining the probability is based on past data extractions from the source;
   in an instance in which the probability of the data change exceeds a change threshold, invoking an extraction function for extracting data from the source; and
   extracting data from the source.

2. The method of claim 1, wherein when the probability of the data change is below the change threshold, delaying invocation of the extraction function.

3. The method of claim 1, wherein determining the probability is based on at least one of:
   a month of the year of previous data extractions;
   a week of the month of previous data extractions;
   a day of the week of previous data extractions;
   an hour of the day of previous data extractions; and
   a minute of the hour of previous data extractions.

4. The method of claim 1, wherein the extraction function is code that executes on a server remote from the source.

5. The method of claim 1, wherein determining the probability is performed by a machine learning model.

6. The method of claim 5, further comprising, after an attempted data extraction by the extraction function, providing information regarding the attempted data extraction to the machine learning model for further training or revision.

7. The method of claim 1, further comprising persistently storing the extracted data.

8. A non-transitory, computer-readable medium containing instructions that, when executed by a hardware-based processor, performs stages for performing dynamic data extraction from a source, the stages comprising:
   waking up a function based on a regular poll interval;
   determining a probability of a data change at the source, wherein determining the probability is based on past data extractions from the source;
   in an instance in which the probability of the data change exceeds a change threshold, invoking an extraction function for extracting data from the source; and
   extracting data from the source.

9. The non-transitory, computer-readable medium of claim 8, wherein when the probability of the data change is below the change threshold, delaying invocation of the extraction function.

10. The non-transitory, computer-readable medium of claim 8, wherein determining the probability is based on at least one of:
    a month of the year of previous data extractions;
    a week of the month of previous data extractions;
    a day of the week of previous data extractions;
    an hour of the day of previous data extractions; and
    a minute of the hour of previous data extractions.

11. The non-transitory, computer-readable medium of claim 8, wherein the extraction function is code that executes on a server remote from the source.

12. The non-transitory, computer-readable medium of claim 8, wherein determining the probability is performed by a machine learning model.

13. The non-transitory, computer-readable medium of claim 12, the stages further comprising, after an attempted data extraction by the extraction function, providing information regarding the attempted data extraction to the machine learning model for further training or revision.

14. The non-transitory, computer-readable medium of claim 8, further comprising persistently storing the extracted data.

15. A system for performing dynamic data extraction from a source, comprising:
- a memory storage including a non-transitory, computer-readable medium comprising instructions; and
- a computing device including a hardware-based processor that executes the instructions to carry out stages comprising:
  - waking up a function based on a regular poll interval;
  - determining a probability of a data change at the source, wherein determining the probability is based on past data extractions from the source;
  - in an instance in which the probability of the data change exceeds a change threshold, invoking an extraction function for extracting data from the source; and
  - extracting data from the source.

16. The system of claim 15, wherein when the probability of the data change is below the change threshold, delaying invocation of the extraction function.

17. The system of claim 15, wherein determining the probability is based on at least one of:
- a month of the year of previous data extractions;
- a week of the month of previous data extractions;
- a day of the week of previous data extractions;
- an hour of the day of previous data extractions; and
- a minute of the hour of previous data extractions.

18. The system of claim 15, wherein the extraction function is code that executes on a server remote from the source.

19. The system of claim 15, wherein determining the probability is performed by a machine learning model.

20. The system of claim 19, the stages further comprising, after an attempted data extraction by the extraction function, providing information regarding the attempted data extraction to the machine learning model for further training or revision.

* * * * *